(12) United States Patent
Zhang et al.

(10) Patent No.: US 11,556,491 B2
(45) Date of Patent: *Jan. 17, 2023

(54) DATA TRANSMISSION METHOD AND APPARATUS USED IN VIRTUAL SWITCH TECHNOLOGY

(71) Applicant: HUAWEI TECHNOLOGIES CO., LTD., Guangdong (CN)

(72) Inventors: Ming Zhang, Shenzhen (CN); Lina Lu, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,134

(22) Filed: Mar. 26, 2021

(65) Prior Publication Data

US 2021/0216488 A1    Jul. 15, 2021

Related U.S. Application Data

(63) Continuation of application No. 16/170,602, filed on Oct. 25, 2018, now Pat. No. 10,977,203, which is a
(Continued)

(30) Foreign Application Priority Data

Apr. 29, 2016    (CN) .......................... 201610286786.7

(51) Int. Cl.
*G06F 13/42*        (2006.01)
*G06F 9/455*        (2018.01)
(Continued)

(52) U.S. Cl.
CPC .......... *G06F 13/4221* (2013.01); *G06F 3/067* (2013.01); *G06F 3/0607* (2013.01);
(Continued)

(58) Field of Classification Search
CPC .. G06F 13/4221; G06F 3/0607; G06F 3/0661; G06F 3/0664; G06F 3/067;
(Continued)

(56) References Cited

U.S. PATENT DOCUMENTS 7,089,587 B2    8/2006    Allen et al.
7,577,735 B1 *  8/2009    De Groote .............. H04L 45/00
                                                                    709/224
(Continued)

FOREIGN PATENT DOCUMENTS

CN        101485863 A      7/2009
CN        101557420 A     10/2009
(Continued)

OTHER PUBLICATIONS

M. Tim Jones: Virtual networking in Linux NICs, switches, networks, and appliances, developer works. IBM. Oct. 27, 2010. 8 pages. XP055561276.

*Primary Examiner* — Henry Tsai
*Assistant Examiner* — Aurangzeb Hassan
(74) *Attorney, Agent, or Firm* — Womble Bond Dickinson (US) LLP (57)    ABSTRACT

A data transmission method and an apparatus used in a virtual switch technology are provided, and the method includes: receiving an IO request of a virtual machine VM for accessing a file or a disk, and When the IO request is to be sent to a physical NIC by using a user mode Open vSwitch (OVS), converting the IO request into an Internet Small Computer Systems Interface (iSCSI) command in a user mode, and then sending the iSCSI command to the user mode OVS, where the user mode OVS sends the iSCSI command to the physical NIC.

8 Claims, 6 Drawing Sheets

Related U.S. Application Data continuation of application No. PCT/CN2017/081118, filed on Apr. 19, 2017.

(51) Int. Cl.
*G06F 3/06* (2006.01)
*H04L 49/00* (2022.01)

(52) U.S. Cl.
CPC .......... *G06F 3/0661* (2013.01); *G06F 3/0664* (2013.01); *G06F 9/455* (2013.01); *G06F 9/45558* (2013.01); *G06F 2009/45579* (2013.01); *G06F 2009/45595* (2013.01); *G06F 2213/0036* (2013.01); *H04L 49/70* (2013.01)

(58) Field of Classification Search
CPC .......... G06F 9/455; G06F 9/45558; G06F 2009/45579; G06F 2009/45595; G06F 2213/0036; H04L 49/70
See application file for complete search history.

(56) References Cited

U.S. PATENT DOCUMENTS

| | | |
|---|---|---|
| 7,808,996 B2 | 10/2010 | Chung et al. |
| 8,601,473 B1 | 12/2013 | Aron et al. |
| 8,719,817 B2 | 5/2014 | Aswani et al. |
| 9,390,034 B1 | 7/2016 | Fair |
| 9,571,426 B2 | 2/2017 | Agarwal et al. |
| 10,270,712 B1* | 4/2019 | Lippitt .................... H04L 45/64 |
| 2005/0281261 A1 | 12/2005 | Zur et al. |
| 2005/0281280 A1 | 12/2005 | Zur et al. |
| 2007/0067497 A1 | 3/2007 | Craft et al. |
| 2008/0104589 A1 | 5/2008 | Mccrory et al. |
| 2012/0072669 A1 | 3/2012 | Nishiguchi et al. |
| 2012/0198097 A1 | 8/2012 | Cota-Robles et al. |
| 2014/0304402 A1 | 10/2014 | Prakash et al. |
| 2015/0008777 A1 | 1/2015 | Herbert et al. |
| 2015/0012712 A1 | 1/2015 | Penner |
| 2016/0328272 A1 | 11/2016 | Ahmed et al. |
| 2017/0109176 A1 | 4/2017 | Shih |
| 2018/0136957 A1 | 5/2018 | Guo et al. |

FOREIGN PATENT DOCUMENTS

| | | |
|---|---|---|
| CN | 102073556 A | 5/2011 |
| CN | 102497434 A | 6/2012 |
| CN | 102662910 A | 9/2012 |
| CN | 104104705 A | 10/2014 |
| CN | 104601468 A | 5/2015 |
| CN | 106020926 A | 10/2016 |

* cited by examiner

DATA TRANSMISSION METHOD AND APPARATUS USED IN VIRTUAL SWITCH TECHNOLOGY

CROSS-REFERENCE TO RELATED APPLICATIONS

This application is a continuation of U.S. patent application Ser. No. 16/170,602, filed on Oct. 25, 2018, which is a continuation of International Application No. PCT/CN2017/081118, filed on Apr. 19, 2017, which claims priority to Chinese Patent Application No. 201610286786.7, filed on Apr. 29, 2016. All of the aforementioned patent applications are hereby incorporated by reference in their entireties.

TECHNICAL FIELD

The present invention relates to the field of communications technologies, and in particular, to a data transmission method and an apparatus used in a virtual switch technology.

BACKGROUND

A virtual switch is mainly applied to a server virtualization scenario, and mainly implements two functions: Function 1: transferring network traffic between virtual machines (VM); and Function 2: implementing communication between a VM and an external network.

In a Linux implementation, operation space is divided into two parts: user mode operation space and kernel mode operation space. A user mode Open vSwitch (OVS) is a switch whose data plane forwarding function is implemented in the Linux user mode operation space, and the user mode OVS is connected to a physical NIC by using a Data Plane Development Kit (DPDK) as a data channel. In addition, the user mode OVS shares a management platform with a kernel mode OVS. A rate limiting function is set for the user mode OVS to implement network adapter rate limiting, so as to provide a solution of a high-performance virtual switch for a virtualization scenario.

The DPDK is a set of libraries and drivers for fast packet processing. A Linux kernel interrupt mechanism that operates in Linux user space cannot meet a performance requirement of a network adapter with a high throughput (for example, 40 GE). Intel puts forward the DPDK to resolve this problem, and network adapter rate limiting may be achieved by using the DPDK.

Figure 1:
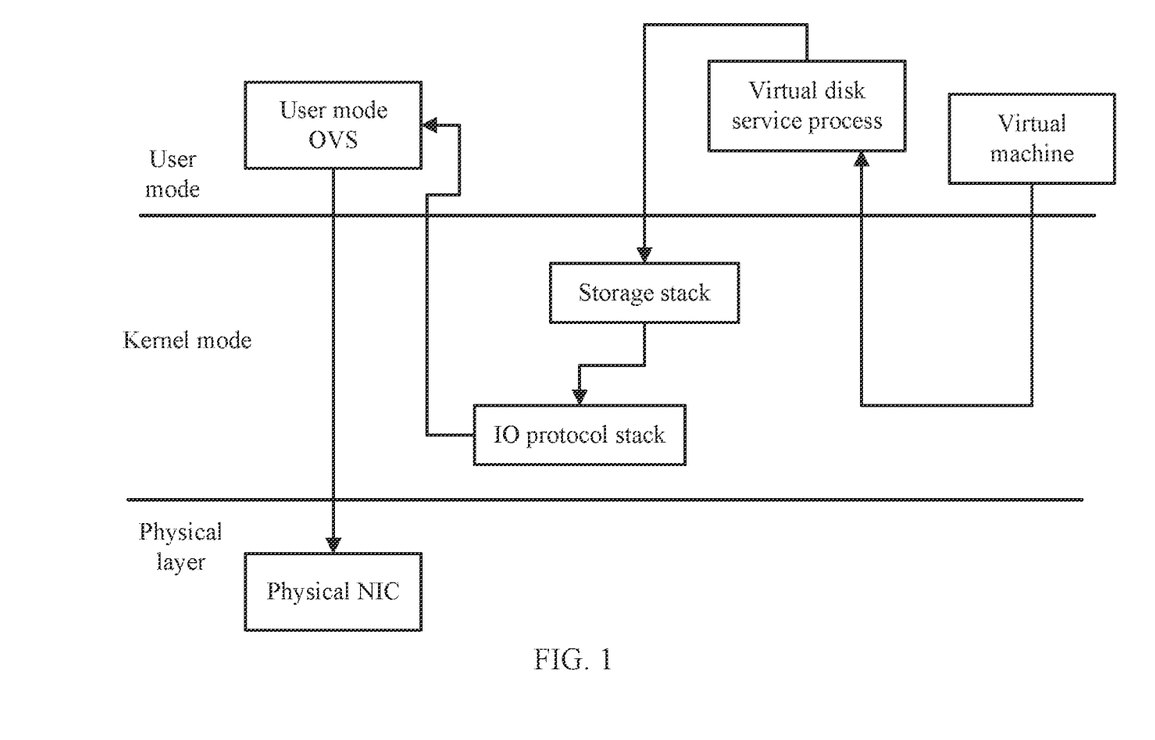
FIG. 1 is a schematic diagram of a path for processing an IO request by a virtual machine in an existing user mode OVS solution.

In an existing user mode OVS solution, a path of processing an IO request by a virtual machine is shown in FIG. 1. A virtual disk service process receives an IO request sent by the virtual machine, and places the IO request in a storage stack. The storage stack converts the IO request into an IO packet and submits the IO packet to an IO protocol stack. Then the IO protocol stack transfers the IO packet to the user mode OVS by using a socket mechanism. Finally, the user mode OVS sends the packet by using the DPDK and the physical NIC.

In a process of forwarding the IO packet by using the user mode OVS, the IO packet needs to be switched from the user mode OVS to a kernel mode, and then be switched from the kernel mode to the user mode. Therefore, context switching is required. In addition, to forward the IO packet from the user mode to the storage stack of the kernel mode, the IO packet needs to be copied. Consequently, in the prior art, performance of a virtual machine of the user mode OVS for processing the IO request is relatively low.

SUMMARY

Embodiments of the present invention provide a data transmission method and an apparatus used in a virtual switch technology. The method and apparatus provided by the present invention resolve a prior-art problem that performance of a virtual machine of a user mode OVS for processing an IO request is relatively low.

According to a first aspect, a data transmission method used in a virtual switch technology is provided, and the method includes: receiving an IO request sent by a virtual machine VM, and determining whether the IO request needs to be sent to a physical NIC by using a user mode Open vSwitch OVS, where the user mode OVS implements network interworking between virtual machines on a same host or virtual machines on different hosts; and if the IO request needs to be sent to the physical NIC by using the user mode OVS, converting the IO request into an Internet Small Computer Systems Interface iSCSI command in a user mode, and then sending the iSCSI command to the user mode OVS, so as to send the iSCSI command to the physical NIC by using the user mode OVS.

In this embodiment, when processing the IO request, the virtual machine determines whether the IO request is forwarded by using the user mode OVS, and if the IO request is forwarded by using the user mode OVS, the virtual machine directly converts, in the user mode, the IO request into a format that can be processed by the user mode OVS and then sends the IO request to the user mode OVS for processing. This can avoid context switching during IO request forwarding in the prior art. Therefore, performance of the virtual machine for processing the IO request can be effectively improved.

With reference to the first aspect, in a possible design, the converting the IO request into an Internet Small Computer Systems Interface iSCSI command includes: converting the IO request into a Small Computer System Interface SCSI command; and adding an Internet Small Computer Systems Interface iSCSI header to the SCSI command to obtain the iSCSI command.

Optionally, to implement classification of IO requests, an IO request that needs to be sent by using the user mode OVS is separated from the IO requests. The determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

According to a second aspect, based on an IO request sending process in the first aspect, a data transmission method used in a virtual switch technology is provided in the second aspect. The method implements processing of a response to an IO request, and the method specifically includes: receiving an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and converting the iSCSI packet into an IO response in a user mode, and then sending the IO response to the virtual machine that initiates the IO request.

With reference to the second aspect, in a possible design, the converting the iSCSI packet into an IO response in a user mode, and then sending the IO response to the virtual machine that initiates the IO request includes:

converting the iSCSI packet into an SCSI response; and converting the SCSI response into the IO response, and sending the IO response to the virtual machine that initiates the IO request.

The method provided in the first aspect is an IO request initiation process, and the method provided in the second aspect is a process of processing the response to the IO request. Therefore, in a specific implementation, a specific effect of the method provided in the second aspect is the same as that of the method provided in the first aspect.

According to a third aspect, an electronic device is provided, and the electronic device includes:

a determining module, configured to: receive an IO request sent by a virtual machine VM, and determine whether the IO request needs to be sent to a physical NIC by using a user mode Open vSwitch OVS, where the user mode OVS implements network interworking between virtual machines on a same host or virtual machines on different hosts; and a conversion module, configured to: if the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

With reference to the third aspect, in a possible design, the determining module is specifically configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

With reference to the third aspect, in a possible design, the conversion module is specifically configured to: convert the IO request into a Small Computer System Interface SCSI command, and add an Internet Small Computer Systems Interface iSCSI header to the SCSI command to obtain the iSCSI command.

According to a fourth aspect, an electronic device is provided, including:

a receiving module, configured to: receive an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and a conversion module, configured to: convert the iSCSI packet into an IO response in a user mode, and then send the IO response to the virtual machine that initiates the IO request.

In a possible design, the conversion module is specifically configured to: convert the iSCSI packet into an SCSI response, convert the SCSI response into the IO response, and send the IO response to the virtual machine that initiates the IO request.

According to a fifth aspect, a computer readable storage medium is provided. The readable storage medium stores program code that implements the data transmission method used in the virtual switch technology described in the first aspect. The program code includes an execution instruction for operating the data transmission method used in the virtual switch technology described in the first aspect.

According to a sixth aspect, a computer readable storage medium is provided. The readable storage medium stores program code that implements the data transmission method used in the virtual switch technology described in the second aspect. The program code includes an execution instruction for operating the data transmission method used in the virtual switch technology described in the second aspect.

According to a seventh aspect, an embodiment of the present invention provides a computer storage medium, configured to store a computer software instruction used by the base station, and the computer storage medium includes a program designed to execute the foregoing aspects.

According to an eighth aspect, an electronic device is provided, and the electronic device includes a virtual machine, a hypervisor, and a hardware layer. A network interface device may be specifically a physical NIC.

The hypervisor may operate in two modes: a user mode and a kernel mode. In this embodiment, to improve a capability of processing an IO request by the virtual machine, the hypervisor is specifically configured to:

receive an IO request sent by the virtual machine VM, and determine whether the IO request needs to be sent to the physical NIC by using a user mode Open vSwitch OVS, where the user mode OVS implements network interworking between virtual machines on a same host or virtual machines on different hosts; and if the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

In another design of the eighth aspect, the hypervisor is configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

In another design of the eighth aspect, the hypervisor is configured to: convert the IO request into a Small Computer System Interface SCSI command, and add an Internet Small Computer Systems Interface iSCSI header to the SCSI command to obtain the iSCSI command.

A specific implementation of a response to an IO request is the same as that of a structure of the electronic device in the foregoing instance, but the hypervisor 320 processes, in a different manner, a response fed back by the physical NIC. The hypervisor is configured to: receive an Internet Small Computer Systems Interface iSCSI packet returned by the physical NIC in response to an IO request; and convert the iSCSI packet into an IO response in a user mode, and then send the IO response to a virtual machine that initiates the IO request, where the iSCSI packet needs to be sent, by using a user mode Open vSwitch OVS, to the virtual machine that initiates the IO request, and the user mode OVS implements network interworking between virtual machines on a same host or virtual machines on different hosts.

In another design of the eighth aspect, the hypervisor is configured to: convert the iSCSI packet into an SCSI response, convert the SCSI response into the IO response, and send the IO response to the virtual machine that initiates the IO request.

One or two of the foregoing technical solutions have at least the following technical effects:

According to the method and apparatus provided in the embodiments of the present invention, the IO request that needs to be sent to the physical NIC by using the user mode OVS is directly converted, in the user mode, into a format that can be processed by the user mode OVS, and then is sent to the user mode OVS. This avoids a process of switching the IO request from the user mode to the kernel mode, and then from the kernel mode to the user mode. Therefore, the performance of the virtual machine for processing the IO request can be effectively improved.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In an existing user mode OVS solution, performance of a virtual machine for processing an IO request is relatively low. Main reasons for this problem include: A: After the IO request is sent from a virtual disk service process (tapdisk2), context switching is performed twice (that is, the IO request is switched from a user mode to a kernel mode, and then switched from the kernel mode to the user mode); B: In a process of forwarding the IO request, a packet splitting operation is required from a storage stack to a user mode OVS; and C: When the virtual machine processes the IO request by using a procedure shown in FIG. 1, quality of service (Quality of Service, QoS) control is performed twice. QoS control is performed in the storage stack, and the user mode OVS also has a QoS control capability. Consequently, the performance of the virtual machine for processing the IO request is affected to some extent.

Based on the foregoing reasons, in the solutions provided in the embodiments of the present invention, if an IO request needs to be sent to a physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, and further avoids the foregoing problems. Therefore, the performance of the virtual machine for processing the IO request can be effectively improved. For a specific implementation, refer to the following instances:

Embodiment 1

Figure 2:
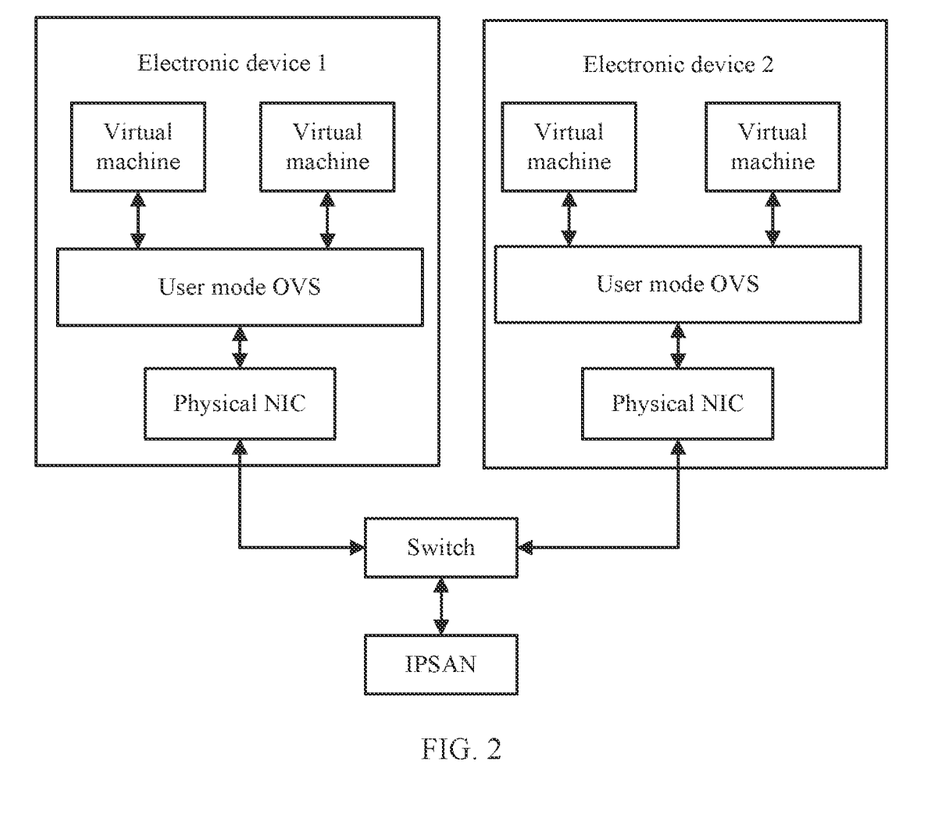
FIG. 2 is a schematic structural diagram of a system for implementing a server virtualization scenario used in an embodiment of the present invention.
Figure 3:
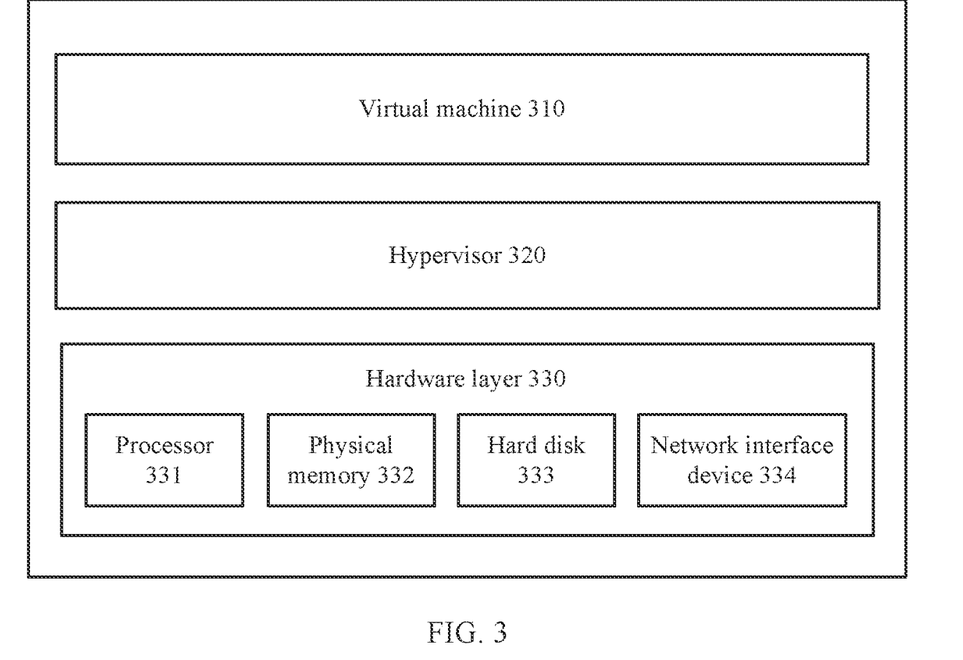
FIG. 3 is a schematic structural diagram of an electronic device according to an embodiment of the present invention.

A structure of a system for implementing a server virtualization scenario in this embodiment of the present invention is shown in FIG. 2. A user mode OVS implements network interworking between virtual switches, including virtual machines on a same host and virtual machines on different hosts. A virtual disk file of a virtual machine is stored on an Internet Protocol Storage Area Network (IP-SAN) device that is connected to the virtual machine by using a network. An IO request processed by the virtual machine is sent to the IPSAN device by using the user mode OVS, to implement virtual storage and access. Based on the system structure shown in FIG. 2, the embodiments of the present invention provide an electronic device, and a specific implementation of the electronic device may be as follows:

As shown in FIG. 3, an embodiment of the present invention provides an electronic device, and the electronic device includes a virtual machine 310, a hypervisor 320, and a hardware layer 330. The virtual machine 310 is constructed based on the hardware layer 330, and the hypervisor 320 implements data monitoring and transmission between the virtual machine 310 and the hardware layer 330. The hardware layer 330 includes a processor 331, a physical memory 332, a hard disk 333, a network interface device 334, and the like. The network interface device 334 may be specifically a physical NIC.

The hypervisor 320 may operate in two modes: a user mode and a kernel mode. In this embodiment, to improve a capability of the virtual machine for processing an IO request, the hypervisor 320 is specifically configured to:

receive an IO request sent by the virtual machine VM, and determine whether the IO request needs to be sent to the physical NIC (in this embodiment, the physical NIC may be one of the network interface device 334 in FIG. 3) by using a user mode Open vSwitch OVS, where the user mode OVS implements network interworking between virtual machines on a same host or virtual machines on different hosts; and if the IO request needs to be sent to the physical NIC by using the user mode OVS, convert the IO request into an Internet Small Computer Systems Interface (iSCSI) command in a user mode, and then send the iSCSI command to the user mode OVS, so as to send the iSCSI command to the physical NIC by using the user mode OVS.

Optionally, a specific implementation of determining, by the hypervisor 320, whether the IO request is to be sent to the physical NIC by using the user mode OVS is:

determining disk information of a disk to be accessed by the IO request or a disk in which a file to be accessed by the IO request is located; determining, according to the disk information, whether the disk to be accessed by the IO request is a disk of a remote terminal; and if the disk to be accessed by the IO request is the disk of the remote terminal, determining that the IO request needs to be sent to the physical NIC by using the user mode OVS.

Optionally, that the hypervisor 320 converts the IO request into the Internet Small Computer Systems Interface iSCSI command includes:

converting the IO request into a Small Computer System Interface SCSI command; and adding an Internet Small Computer Systems Interface iSCSI header to the SCSI command to obtain the iSCSI command.

A specific implementation of a response to the IO request is the same as that of a structure of the electronic device in the foregoing instance, but the hypervisor 320 processes, in a different manner, a response fed back by the physical NIC. Therefore, based on the structure shown in FIG. 3, the specific implementation of the response to the IO request may be as follows:

The hypervisor 320 is configured to: receive an Internet Small Computer Systems Interface iSCSI packet returned by the physical NIC in response to the IO request; and convert the iSCSI packet into an IO response in the user mode, and then send the IO response to the virtual machine that initiates the IO request, where the iSCSI packet needs to be sent, by using the user mode Open vSwitch OVS, to the virtual machine that initiates the IO request, and the user mode OVS implements network interworking between virtual machines on a same host or virtual machines on different hosts.

Optionally, a specific implementation of converting, by the hypervisor 320, the iSCSI packet into the IO response in the user mode, and then sending the IO response to the virtual machine that initiates the IO request includes:

converting the iSCSI packet into an SCSI response; and
converting the SCSI response into the IO response, and sending the IO response to the virtual machine that initiates the IO request.

In the solution provided in this embodiment of the present invention, if the IO request needs to be sent to the physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, thereby avoiding a prior-art problem that performance of a virtual machine of the user mode OVS for processing the IO request is relatively low. Therefore, the performance of the virtual machine for processing the IO request can be effectively improved.

Embodiment 2

Figure 4:
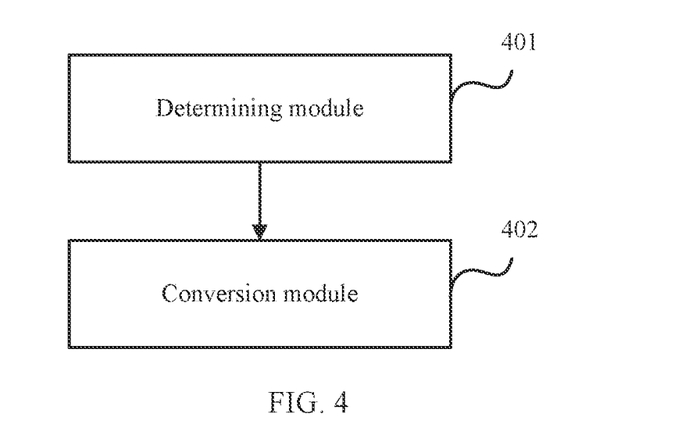
FIG. 4 is a schematic structural diagram of another electronic device according to an embodiment of the present invention.

As shown in FIG. 4, this embodiment of the present invention provides an electronic device, and the electronic device may specifically include a determining module 401 and a conversion module 402.

The determining module 401 is configured to: receive an IO request sent by a virtual machine VM, and determine whether the IO request needs to be sent to a physical NIC by using a user mode Open vSwitch OVS, where the user mode OVS implements network interworking between virtual machines on a same host or virtual machines on different hosts.

Optionally, when the determining module 401 determines whether the IO request needs to be sent to the physical NIC by using the user mode OVS, a specific implementation may be as follows:

The determining module 401 is specifically configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

The conversion module 402 is configured to: if that the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

Optionally, the conversion module 402 is specifically configured to: convert the IO request into a Small Computer System Interface SCSI command, and add an Internet Small Computer Systems Interface iSCSI header to the SCSI command to obtain the iSCSI command.

Embodiment 3

Figure 5:
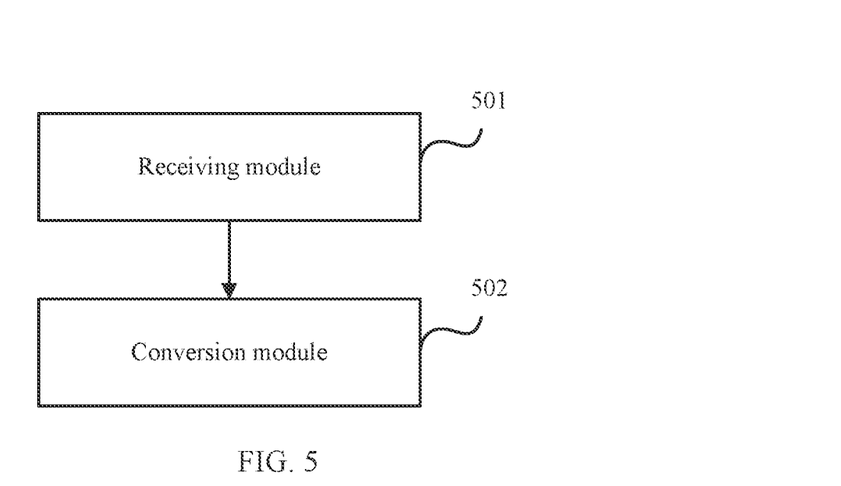
FIG. 5 is a schematic structural diagram of another electronic device according to an embodiment of the present invention.

As shown in FIG. 5, this embodiment of the present invention provides an electronic device, and a specific implementation of the electronic device includes:

a receiving module 501, configured to: receive an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and a conversion module 502, configured to: convert the iSCSI packet into an IO response in a user mode, and then send the IO response to the virtual machine that initiates the IO request.

Optionally, a specific implementation of converting the iSCSI packet into the IO response may be as follows:

The conversion module 502 is specifically configured to: convert the iSCSI packet into an SCSI response, convert the SCSI response into the IO response, and send the IO response to the virtual machine that initiates the IO request.

Embodiment 4

Figure 6:
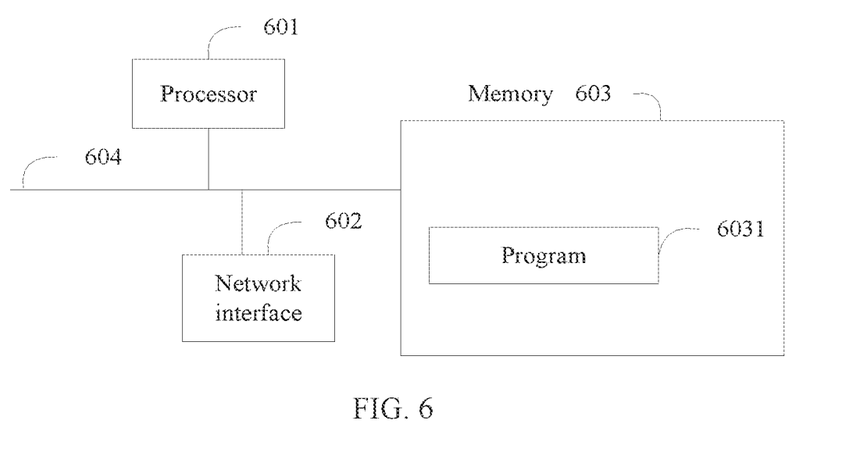
FIG. 6 is a schematic structural diagram of another electronic device according to an embodiment of the present invention.

As shown in FIG. 6, the present invention further provides another electronic device, configured to execute a data transmission method in a virtual switch technology in the foregoing embodiments. The electronic device includes at least one processor 601 (for example, a CPU), at least one network interface 602 or another communications interface, a memory 603, and at least one communications bus 604 that is configured to implement connection and communication between these apparatuses. The processor 601 is configured to execute an executable module stored in the memory 603, for example, a computer program. The memory 603 may include a high-speed Random Access Memory (RAM), and may further include a nonvolatile memory, for example, at least one magnetic disk storage. The at least one network interface 602 (which may be wired or wireless) may implement a communicative connection between the system gateway and at least one other network element by using the Internet, a wide area network, a local network, a metropolitan area network, or the like.

In some implementations, the memory stores a program 6031, the program may be executed by the processor, and the program includes:

receiving an IO request sent by a virtual machine VM, and determining whether the IO request needs to be sent to a physical NIC by using a user mode Open vSwitch OVS, where the user mode OVS implements network interworking between virtual machines on a same host or virtual machines on different hosts; and if that the IO request needs to be sent to the physical NIC by using the user mode OVS, converting the IO request into an Internet Small Computer Systems Interface iSCSI command in a user mode, and then sending the iSCSI command to the user mode OVS, so as to send the iSCSI command to the physical NIC by using the user mode OVS.

Optionally, the determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

Optionally, the converting the IO request into an Internet Small Computer Systems Interface iSCSI command includes:

converting the IO request into a Small Computer System Interface SCSI command; and adding an Internet Small Computer Systems Interface iSCSI header to the SCSI command to obtain the iSCSI command.

Based on a structure shown in FIG. 6, to process a response that is to the IO request and that is returned by the physical NIC, correspondingly, the program 6031 stored by the memory further includes:

receiving an Internet Small Computer Systems Interface iSCSI packet returned by the physical NIC in response to the IO request, where the iSCSI packet needs to be sent, by using the user mode Open vSwitch OVS, to the virtual machine that initiates the IO request, and the user mode OVS implements network interworking between virtual machines on a same host or virtual machines on different hosts; and converting the iSCSI packet into an IO response in the user mode, and then sending the IO response to the virtual machine that initiates the IO request.

Optionally, the converting the iSCSI packet into an IO response in the user mode, and then sending the IO response to the virtual machine that initiates the IO request includes:

converting the iSCSI packet into an SCSI response; and converting the SCSI response into the IO response, and sending the IO response to the virtual machine that initiates the IO request.

Embodiment 5

Figure 7:
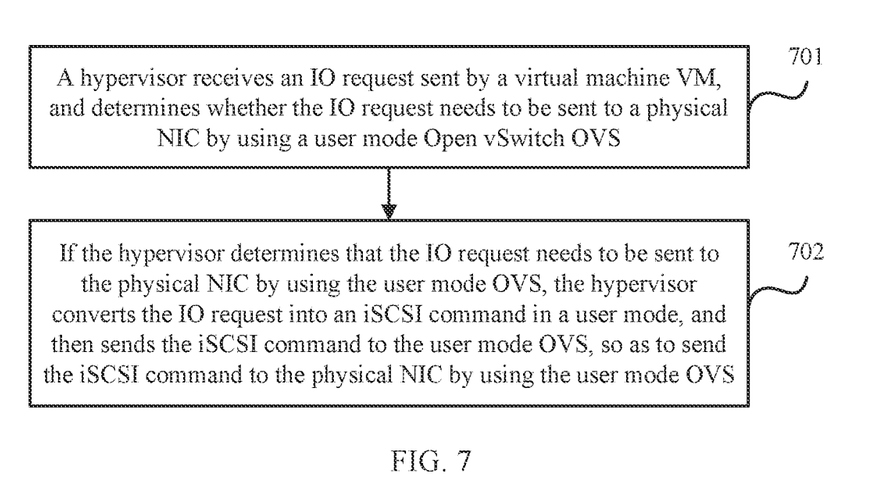
FIG. 7 is a flowchart of a data transmission method used in a virtual switch technology according to an embodiment of the present invention.

Based on apparatus structures provided in the foregoing embodiments, this embodiment of the present invention provides a data transmission method used in a virtual switch technology. The method specifically includes the following steps (an implementation procedure is shown in FIG. 7).

The method provided in this embodiment of the present invention may be implemented based on the apparatus structures shown in FIG. 3, FIG. 4, and FIG. 6. Different apparatuses execute the method in this embodiment of the present invention by using different specific function modules. For a specific function module that implements the method of the present invention, reference may be made to specific descriptions of different apparatuses in Embodiment 1 to Embodiment 4. For ease of description, with reference to Embodiment 3, the following describes in detail the data transmission method used in the virtual switch technology provided in this embodiment of the present invention.

Step 701: A hypervisor receives an IO request sent by a virtual machine VM, and determines whether the IO request needs to be sent to a physical NIC by using a user mode Open vSwitch OVS, where the user mode OVS implements network interworking between virtual machines on a same host or virtual machines on different hosts.

Optionally, the determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

Based on the system structure shown in FIG. 2, the remote terminal may be a device that is connected, by using a switch, to an electronic device that implements the method in this embodiment of the present invention.

In this embodiment, if it is determined, according to the disk information, that the IO request is to access a local device disk, the IO request is directly forwarded to the physical NIC by using a kernel mode.

Step 702: If the hypervisor determines that the IO request needs to be sent to the physical NIC by using the user mode OVS, the hypervisor converts the IO request into an iSCSI command in a user mode, and then sends the iSCSI command to the user mode OVS, so as to send the iSCSI command to the physical NIC by using the user mode OVS.

To ensure that the IO request can be transmitted on a network, when the IO request is transmitted on different hosts, the IO request needs to be converted into the iSCSI command, and then the packet is converted into the IO request on a target server. In this embodiment, to convert an IO request sent by tapdisk2 into an iSCSI command that can be identified by the user mode OVS, in a solution provided in this embodiment, the IO request may be converted in the user mode.

a1. Convert the IO request into a Small Computer System Interface (SCSI) command.

Specifically, major and minor device numbers (which include an ID of a storage block device that initiates accessing and an ID of a storage block device that needs to be accessed by the IO request), a first sector, a request size, and whether the request is a request for a read operation or a request for a write operation that are corresponding to the IO request are obtained from the IO request.

A specific implementation of converting the IO request into the SCSI command may be that the ID of the storage block device that needs to be accessed by the IO request is converted into a logical unit number (LUN) of a destination host in the corresponding SCSI command, the first sector needs to be converted into a physical disk address, the read operation or the write operation needs to be converted into an SCSI operation direction, and after the foregoing conversion is implemented, the content obtained after conversion is encapsulated into the SCSI command.

a2. Convert the SCSI command into the iSCSI command. A specific implementation is:

adding an iSCSI header to the SCSI command, where the iSCSI header is encapsulated according to an iSCSI protocol, and the iSCSI header includes a basic header segment (BHS), an additional header segment (AHS), a header-digest, a data-digest, and the like.

Different from the IO request sending path shown in FIG. 1, in the method provided in this embodiment of the present invention, an IO request sent by a virtual disk service may be directly sent to the user mode OVS in the user mode. A specific schematic diagram may be shown in FIG. 8.

According to the method provided in this embodiment of the present invention, the IO request that needs to be sent to the physical NIC by using the user mode OVS is directly converted, in the user mode, into a format that can be processed by the user mode OVS, and then is sent to the user mode OVS. This avoids a process of switching the IO request from the user mode to the kernel mode, and then from the kernel mode to the user mode. Therefore, performance of the virtual machine for processing the IO request can be effectively improved.

Embodiment 6

Figure 9:
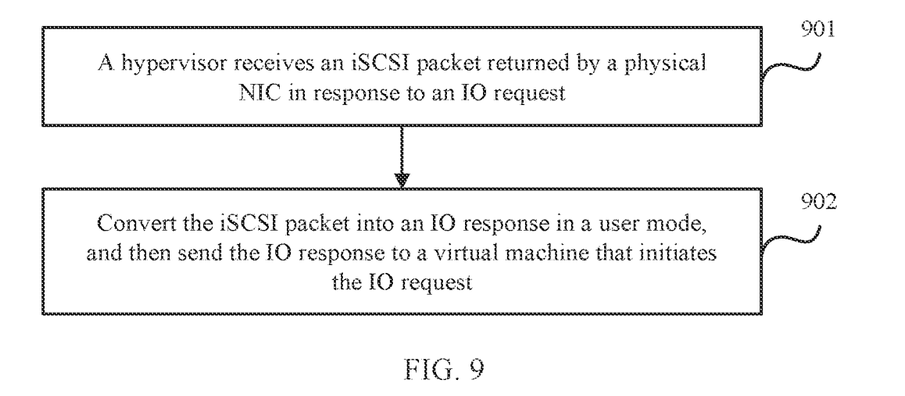
FIG. 9 is a schematic flowchart of another data transmission method used in a virtual switch technology according to an embodiment of the present invention.

As shown in FIG. 9, this embodiment of the present invention further provides a data transmission method used in a virtual switch technology. The method specifically includes the following steps.

The method provided in this embodiment of the present invention may be implemented based on the apparatus structures shown in FIG. 3, FIG. 5, and FIG. 6. Different apparatuses execute the method in this embodiment of the present invention by using different specific function modules. For a specific function module that implements the method of the present invention, reference may be made to specific descriptions of different apparatuses in Embodiment 1 to Embodiment 4. For ease of description, with reference to Embodiment 3, the following describes in detail the data transmission method used in the virtual switch technology provided in this embodiment of the present invention.

Step 901: A hypervisor receives an iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts.

Step 902: Convert the iSCSI packet into an IO response in a user mode, and then send the IO response to the virtual machine that initiates the IO request.

In this embodiment, the converting the iSCSI packet into an IO response in a user mode, and then sending the IO response to the virtual machine that initiates the IO request includes:

converting the iSCSI packet into an SCSI response; and converting the SCSI response into the IO response, and sending the IO response to the virtual machine that initiates the IO request.

The method provided in this embodiment is a procedure in response to the IO request. A solution of this embodiment may be independently implemented, or may be combined with the method provided in Embodiment 1. When the method in this embodiment and the method in Embodiment 1 are combined, a complete process of initiating the IO request and responding to the request may be implemented.

Figure 8:
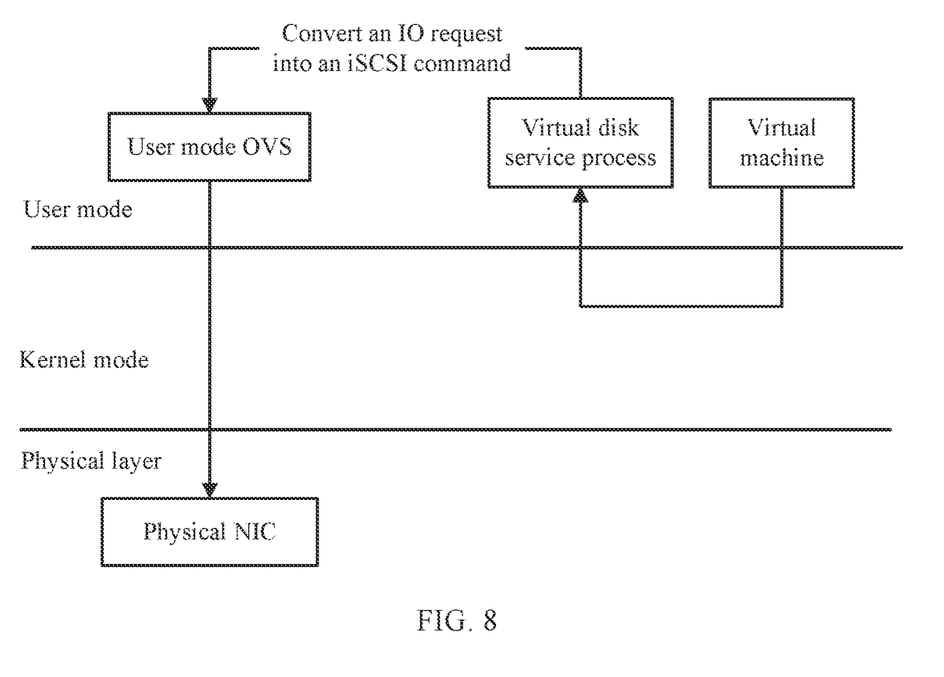
FIG. 8 is a schematic flowchart of a data transmission method used in a virtual switch technology according to an embodiment of the present invention.
Figure 10:
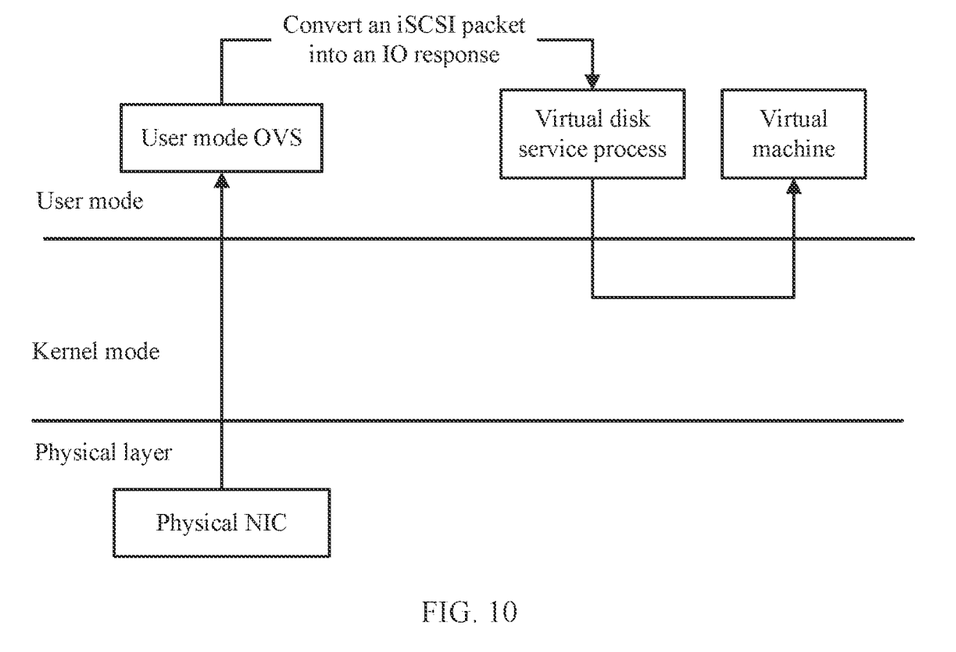
FIG. 10 is a schematic diagram of a path for processing an IO request by a virtual machine according to an embodiment of the present invention.

Different from the IO request sending path shown in FIG. 8, in the method provided in this embodiment of the present invention, an electronic device processes a response to an IO request, and a specific schematic diagram may be shown in FIG. IO.

In the method provided in this embodiment of the present invention, when processing the response to the IO request, the electronic device directly processes and converts a returned packet in the user mode without context switching, thereby shortening a response processing procedure, and effectively improving performance of the virtual machine for processing the IO request.

The foregoing one or more technical solutions in the embodiments of this application have at least the following technical effects:

In the solutions provided in the embodiments of the present invention, if the IO request needs to be sent to the physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, thereby avoiding a prior-art problem that performance of a virtual machine of the user mode OVS for processing the IO request is relatively low. Therefore, the performance of the virtual machine for processing the IO request can be effectively improved.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   receiving, by a hypervisor in a user mode, an input/output (TO) request sent by a virtual machine (VM);
   determining, by the hypervisor in the user mode, disk information of a disk to be accessed by the IO request or a disk in which a file to be accessed by the IO request is located;
   determining, by the hypervisor in the user mode according to the disk information, that the disk to be accessed by the IO request is a disk of a remote terminal;
   in response to determining that the disk to be accessed by the IO request is the disk of the remote terminal, determining, by the hypervisor in the user mode, that the IO request is to be sent to a physical network interface controller (NIC) by using a user mode Open vSwitch (OVS), and converting, by the hypervisor in the user mode, the IO request into an Internet Small Computer Systems Interface (iSCSI) command; and
   sending, by the hypervisor in the user mode, the iSCSI command to the user mode OVS, which sends the iSCSI command to the physical NIC.

2. The data transmission method according to claim 1, wherein the converting of the IO request into the iSCSI command comprises:
   converting the IO request into a Small Computer System Interface (SCSI) command; and
   adding an Internet Small Computer Systems Interface (iSCSI) header to the SCSI command to obtain the iSCSI command.

3. A data transmission method, comprising:
   receiving, by a hypervisor in a user mode, an Internet Small Computer Systems Interface (iSCSI) packet returned by a physical network interface controller (NIC) in response to an input/output (IO) request, wherein the iSCSI packet is to be sent, by using a user mode Open vSwitch (OVS), to a virtual machine that initiates the IO request, and wherein the user mode OVS provides network interworking between virtual machines on a same host or virtual machines on different hosts, wherein the physical NIC receives the IO request that has been converted into a iSCSI command by the hypervisor in the user mode, wherein the hypervisor in the user mode converting the IO request into the iSCSI command further comprises determining disk information of a disk to be accessed by the IO request or a disk in which a file to be accessed by the IO request is located, determining that the disk to be accessed by the IO request is a disk of a remote terminal, and determining that the IO request is to be sent to the physical NIC by using the user mode OVS;
   converting, by the hypervisor in the user mode, the iSCSI packet into an IO response; and
   sending, by the hypervisor in the user mode, the IO response to the virtual machine that initiates the IO request.

4. The data transmission method according to claim 3, wherein the converting of the iSCSI packet into the IO response comprises:
   converting the iSCSI packet into an SCSI response; and
   converting the SCSI response into the IO response.

5. A non-transitory computer storage medium, configured to store instructions, which, when executed by a processor that runs a hypervisor in a user mode, cause the hypervisor in the user mode to perform operations comprising:
   receiving an input/output (IO) request sent by a virtual machine (VM);
   determining disk information of a disk to be accessed by the IO request or a disk in which a file to be accessed by the IO request is located;

determining, according to the disk information, that the disk to be accessed by the IO request is a disk of a remote terminal;

in response to determining that the disk to be accessed by the IO request is the disk of the remote terminal, determining that the IO request is to be sent to a physical network interface controller (NIC) by using a user mode Open vSwitch (OVS), and converting the IO request into an Internet Small Computer Systems Interface (iSCSI) command and;

sending the iSCSI command to the user mode OVS, which sends the iSCSI command to the physical NIC.

6. The non-transitory computer storage medium according to claim 5, wherein the converting of the IO request into the iSCSI command further comprises:

converting, by the hypervisor in the user mode, the IO request into a Small Computer System Interface (SCSI) command; and adding an Internet Small Computer Systems Interface (iSCSI) header to the SCSI command to obtain the iSCSI command.

7. A non-transitory computer storage medium, configured to store instructions, which, when executed by a processor that runs a hypervisor in a user mode, cause the hypervisor in the user mode to perform operations comprising:

receiving an Internet Small Computer Systems Interface (iSCSI) packet returned by a physical network interface controller (NIC) in response to an input/output (IO) request, wherein the iSCSI packet is to be sent, by using a user mode Open vSwitch (OVS), to a virtual machine that initiates the IO request, and the user mode OVS implements network interworking between virtual machines on a same host or virtual machines on different hosts, wherein the physical NIC receives the IO request that has been converted into a iSCSI command by the hypervisor in the user mode, wherein the hypervisor in the user mode converting the IO request into the iSCSI command further comprises determining disk information of a disk to be accessed by the IO request or a disk in which a file to be accessed by the IO request is located, determining that the disk to be accessed by the IO request is a disk of a remote terminal, and determining that the IO request is to be sent to the physical NIC by using the user mode OVS; and converting the iSCSI packet into an IO response in a user mode, and then sending the IO response to the virtual machine that initiates the IO request.

8. The non-transitory computer storage medium according to claim 7, wherein the converting of the iSCSI packet into the IO response further comprises:

converting the iSCSI packet into an SCSI response;

converting the SCSI response into the IO response.

\* \* \* \* \*

UNITED STATES PATENT AND TRADEMARK OFFICE
CERTIFICATE OF CORRECTION

| | | |
|---|---|---|
| PATENT NO. | : 11,556,491 B2 | Page 1 of 1 |
| APPLICATION NO. | : 17/214134 | |
| DATED | : January 17, 2023 | |
| INVENTOR(S) | : Ming Zhang and Lina Lu | |

It is certified that error appears in the above-identified patent and that said Letters Patent is hereby corrected as shown below:

In the Claims

In Claim 1, Column 13, Line 67, delete "(TO)" and insert --(IO)--.

Signed and Sealed this
Eighteenth Day of April, 2023

Katherine Kelly Vidal
*Director of the United States Patent and Trademark Office*